United States Patent
Sakazume (10) Patent No.: US 9,814,080 B2
(45) Date of Patent: Nov. 7, 2017

(54) SERVER DEVICE AND TERMINAL DEVICE TRANSMITTING AUDIO SIGNAL

(71) Applicant: JVC KENWOOD Corporation, Yokohama-shi, Kanagawa (JP)

(72) Inventor: Satoru Sakazume, Yokohama (JP)

(73) Assignee: JVC KENWOOD CORPORATION, Yokohama-shi, Kanagawa (JP)

( * ) Notice: Subject to any disclaimer, the term of this patent is extended or adjusted under 35 U.S.C. 154(b) by 0 days.

(21) Appl. No.: 15/363,825

(22) Filed: Nov. 29, 2016

(65) Prior Publication Data

US 2017/0171891 A1    Jun. 15, 2017

(30) Foreign Application Priority Data

Dec. 9, 2015 (JP) .................. 2015-240120

(51) Int. Cl.
*H04W 76/00* (2009.01)
*H04W 4/10* (2009.01)

(52) U.S. Cl.
CPC ........... *H04W 76/005* (2013.01); *H04W 4/10* (2013.01)

(58) Field of Classification Search
CPC .............................. H04W 76/005; H04W 4/10
USPC ......................................................... 455/518
See application file for complete search history.

(56) References Cited

U.S. PATENT DOCUMENTS

| | | | | |
|---|---|---|---|---|
| 8,494,458 | B2* | 7/2013 | Tucker | H04W 4/10 455/113 |
| 8,688,843 | B2* | 4/2014 | Song | H04L 12/1822 455/518 |
| 9,167,619 | B2* | 10/2015 | Tucker | H04W 4/10 |
| 9,294,887 | B2* | 3/2016 | Song | H04L 12/1822 |
| 9,456,039 | B2* | 9/2016 | Sharma | H04L 67/14 |
| 2006/0211438 | A1* | 9/2006 | Sung | H04W 4/10 455/518 |
| 2007/0249381 | A1* | 10/2007 | Forslow | H04W 72/005 455/517 |
| 2008/0248792 | A1* | 10/2008 | Gundu | H04W 72/005 455/422.1 |
| 2009/0215411 | A1* | 8/2009 | Tucker | H04W 4/10 455/90.2 |
| 2010/0157833 | A1* | 6/2010 | Vrcelj | H04L 27/2626 370/252 |

(Continued)

FOREIGN PATENT DOCUMENTS

JP        2008-532380 A       8/2008

*Primary Examiner* — Hai V Nguyen
(74) *Attorney, Agent, or Firm* — Claire Zopf (57) ABSTRACT

An acquisition unit acquires a reproduction period of an audio signal, a first transmission delay period of from a transmitting side terminal device or a server device to each of receiving side terminal devices, and a second transmission delay period of from each of the receiving side terminal devices to the server device. A derivation unit derives a response period of from when the reproduction of the audio signal ends to when the right-to-speak is requested, for each of the receiving side terminal devices, by subtracting the reproduction period, the first transmission delay period, and the second transmission delay period from timing when the right-to-speak request signal has been received. A comparing unit compares the derived response period of each of the receiving side terminal devices to grant the right-to-speak to any one of the receiving side terminal devices.

13 Claims, 8 Drawing Sheets

(56) References Cited

U.S. PATENT DOCUMENTS

| | | | |
|---|---|---|---|
| 2013/0107834 A1* | 5/2013 | Dutta | H04W 76/005 370/329 |
| 2013/0308495 A1* | 11/2013 | Tucker | H04W 4/10 370/254 |
| 2014/0222961 A1* | 8/2014 | Takahashi | H04N 21/44004 709/217 |
| 2016/0143075 A1* | 5/2016 | Tucker | H04W 72/10 370/329 |
| 2017/0171891 A1* | 6/2017 | Sakazume | H04W 4/10 |

* cited by examiner

| TERMINAL DEVICE | FIRST TRANSMISSION DELAY PERIOD | SECOND TRANSMISSION DELAY PERIOD |
|---|---|---|
| FIRST TERMINAL DEVICE | A1 | B1 |
| SECOND TERMINAL DEVICE | A2 | B2 |
| THIRD TERMINAL DEVICE | A3 | B3 |
| FOURTH TERMINAL DEVICE | A4 | B4 |

SERVER DEVICE AND TERMINAL DEVICE TRANSMITTING AUDIO SIGNAL

CROSS-REFERENCE TO RELATED APPLICATION

This application is based upon and claims the benefit of priority from the prior Japanese Patent Application No. 2015-240120, filed on Dec. 9, 2015, the entire contents of which are incorporated herein by reference.

BACKGROUND

1. Field

The present invention relates to communication technology, and particularly relates to a server device and a terminal device transmitting an audio signal.

2. Description of the Related Art

A Push-to-talk over Cellular (PoC) service is realized by introducing a Push To Talk (PTT) function into a mobile communication network. In PoC sessions, a PoC server receives right-to-speak requests from PoC clients, arranges order, and gives the clients the right-to-speak in that order (see, for example, Patent Literature 1).

CITATION LIST

Patent Literature

[Patent Document 1] Japanese Patent Application Laid-open No. 2008-532380

A PoC server grants the right-to-speak to PoC clients in order of reception of right-to-speak requests. On the other hand, since an IP network such as a mobile communication network and the Internet is used in PoC services, delay time is generated as a result of generation and conversion of transmitted data, as well as duplication and a routing process of transmitted data performed by a router. Therefore, in a case where a transmitting side PoC client transmits data to a plurality of PoC clients belonging to the same group, there occurs a difference in data arrival times among the PoC clients since transmission routes to respective PoC clients are not always the same. As a result, there occurs a difference in time until respective receiving side PoC clients grasp content of the data. In addition, when PoC clients attempt to make some kind of response, there occurs a difference in time for each PoC client until right-to-speak requests therefrom reach the PoC server. The time difference described above causes partiality among PoC clients to acquire the right-to-speak.

SUMMARY

In order to solve the above problem, a server device according to an aspect of an embodiment is a server device which manages the right-to-speak in a case where in a plurality of terminal devices, a terminal device with the right-to-speak is a transmitting side terminal device and a terminal device without the right-to-speak is a receiving side terminal device. The server device includes a receiver, a controller, and a transmitter. The receiver receives, as a response to content of an audio signal received in each of receiving side terminal devices which has received the audio signal from the transmitting side terminal device, right-to-speak request signals transmitted from the receiving side terminal devices. The controller grants the right-to-speak to any one of the receiving side terminal devices based on the right-to-speak request signals received by the receiver. The transmitter notifies the receiving side terminal device to which the right-to-speak has been granted by the controller of the grant of the right-to-speak. The controller includes an acquisition unit, a derivation unit, and a comparing unit. The acquisition unit acquires a reproduction period of the audio signal, a first transmission delay period of from the transmitting side terminal device or the server device to each of the receiving side terminal devices, and a second transmission delay period of from each of the receiving side terminal devices to the server device. The derivation unit derives a response period of from when the reproduction of the audio signal ends to when the right-to-speak is requested, for each of the receiving side terminal devices, by subtracting the reproduction period, the first transmission delay period, and the second transmission delay period from timing when the right-to-speak request signal has been received by the receiver. The comparing unit compares the response period of each of the receiving side terminal devices derived by the derivation unit to grant the right-to-speak to any one of the receiving side terminal devices.

Any combination of the above components, those in which the expression in the embodiment has been converted among methods, devices, systems, recording media, computer programs, and the like, are also effective as an aspect of the embodiment.

DETAILED DESCRIPTION

The invention will now be described by reference to the preferred embodiments. This does not intend to limit the scope of the present invention, but to exemplify the invention.

Prior to specific description of the present invention, an outline thereof is described first. An embodiment relates to a server device which provides a PoC service. In the PoC service, a broadcast communication is performed by a PTT operation with the use of a mobile communication network or the Internet. In the PTT operation, a button included in a terminal device is pushed down by a user. A response to the broadcast communication is performed, after the broadcast communication is finished, through the PTT operation in a terminal device which desires to respond thereto.

In the PoC service, a user who wishes to speak pushes down a button included in a terminal device, thereby transmitting a right-to-speak request signal from the terminal device to a server device. When receiving the right-to-speak request signal, the server device grants the right-to-speak to the terminal device in accordance with the received right-to-speak request signal. The terminal device to which the right-to-speak has been granted can transmit an audio signal of the user. Here, in a case where the server device has received a plurality of right-to-speak request signals in a certain period of time, the server device selects any one of the right-to-speak request signals and grants the right-to-speak to a terminal device, which is a source of the selected right-to-speak request signal. On that occasion, the server device selects, for example, a right-to-speak request signal which has been received earlier.

As described above, each terminal device has different delay time in a transmission route thereof. Therefore, there may be a case where even when a user pushes down the button immediately after hearing an audio signal, the arrival of the right-to-speak request signal at the server device is delayed by a delay in the transmission route. This corresponds to that a terminal device with a shorter delay in the transmission route is more advantageous to acquire a right-to-speak. The server device is required to grant the right-to-speak without partiality. In order to meet the requirement, the server device derives delay time in transmission routes for each terminal device, and grants the right-to-speak in consideration of the delay time in transmission routes in addition to timing when a right-to-speak request signal has been received.

Figure 1:
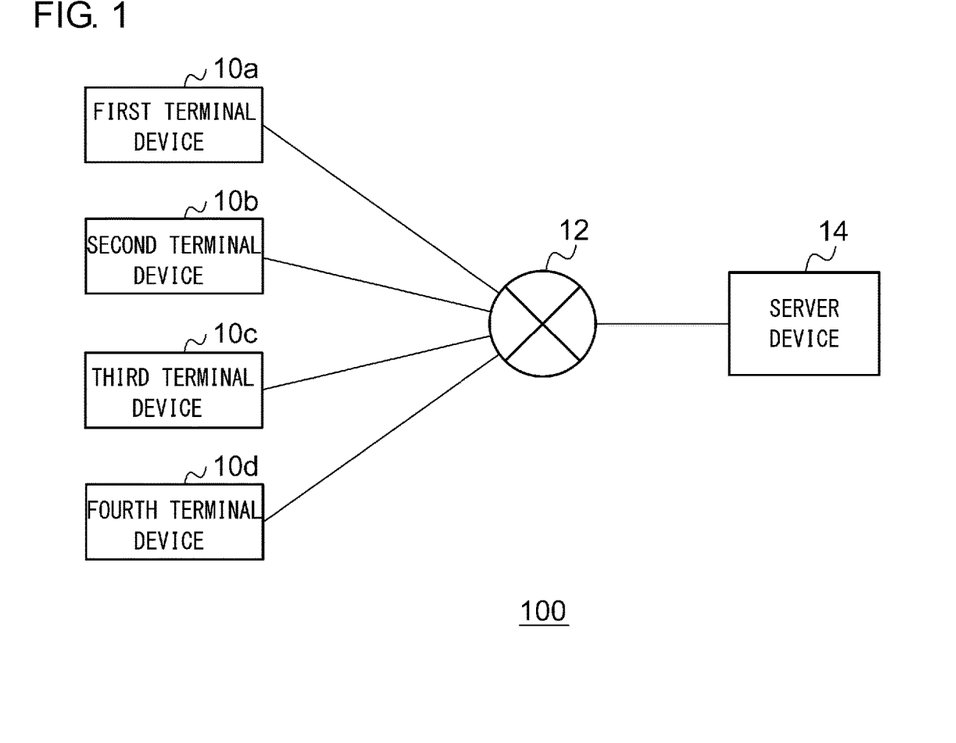
FIG. 1 is a diagram illustrating a configuration of a communication system according to an embodiment.

FIG. 1 illustrates a configuration of a communication system 100 according to the embodiment. The communication system 100 includes a first terminal device 10a, a second terminal device 10b, a third terminal device 10c, and a fourth terminal device 10d, which are collectively referred to as a terminal device 10, and a network 12, and a server device 14.

The terminal device 10 is a device capable of executing communication through a mobile communication network. For the communication through a mobile communication network, a known technique may be used. Therefore, description thereof is omitted here. Although there are various forms of communication through a mobile communication network, a PoC service will be described here. The first terminal device 10a to the fourth terminal device 10d illustrated in FIG. 1 form a group, and the first terminal device 10a has the right-to-speak at an initial stage. Accordingly, the first terminal device 10a corresponds to a transmitting side in audio communication through the PoC service, and the second terminal device 10b to the fourth terminal device 10d correspond to a receiving side in the audio communication through the PoC service. The number of the terminal devices 10 is not limited to "four."

The network 12 is a mobile communication network, but may include the Internet. In addition, the network 12 is configured with wireless communication, wired communication, or a combination thereof. An audio signal in the PoC service transmitted from the first terminal device 10a is received by the second terminal device 10b to the fourth terminal device 10d through the network 12. The audio signal is also received by the server device 14 through the network 12. After the reception of the audio signal by the second terminal device 10b to the fourth terminal device 10d, the right-to-speak request signals transmitted from the second terminal device 10b to the fourth terminal device 10d, respectively, are received by the server device 14 through the network 12.

The server device 14 manages the right-to-speak in a case where in a plurality of terminal devices 10, the first terminal device 10a with the right-to-speak is a transmitting side terminal device 10 and the second terminal device 10b to the fourth terminal device 10d without the right-to-speak are receiving side terminal devices 10 at an initial stage. Following the initial stage as described above, the second terminal device 10b to the fourth terminal device 10d transmit right-to-speak request signals to the server device 14, and the server device 14 receives the right-to-speak request signals.

The server device 14 retains delay time in transmission routes for each terminal device 10, and selects any one of the right-to-speak request signals based on the delay time in transmission routes and reception timing of the right-to-speak request signals. The server device 14 grants the right-to-speak to the source of the selected right-to-speak request signal. In a case where the right-to-speak has been granted to the second terminal device 10b, the second terminal device 10b becomes the transmitting side terminal device 10. An audio signal transmitted from the second terminal device 10b is received by the first terminal device 10a, the third terminal device 10c and the fourth terminal device 10d through the network 12. The audio signal may preferably be received by the server device 14, as well.

Figure 2:
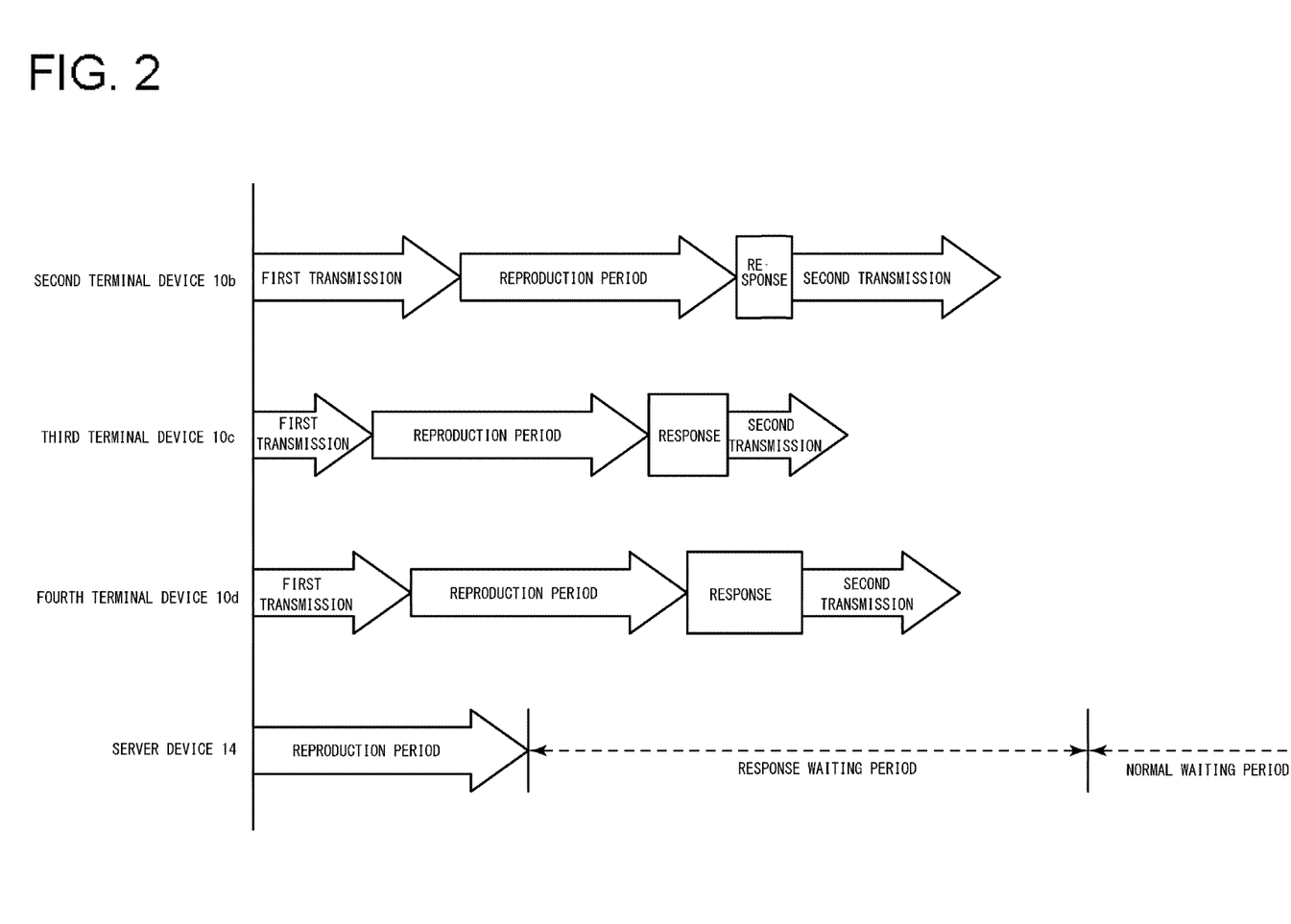
FIG. 2 is a diagram illustrating an outline of a process performed by the communication system of FIG. 1.

FIG. 2 illustrates an outline of a process performed by the communication system 100. Illustrated are processes performed in the second terminal device 10b to the fourth terminal device 10d and the server device 14 after the first terminal device 10a transmits the audio signal, and the horizontal axis indicates time. A "first transmission delay period," which occurs in the second terminal device 10b when the audio signal is transmitted to the second terminal device 10b from the first terminal device 10a, is indicated by a "first transmission." This corresponds to a part of the delay time in transmission routes described above. An "audio signal reproduction period" during which the audio signal received in the second terminal device 10b is reproduced, which follows the first transmission delay period, is indicated by a "reproduction period." A "response period" of from when the reproduction of the audio signal ends to when a user of the second terminal device 10b pushes the button to respond is indicated by a "response." In addition, a "second transmission delay period" of until the right-to-speak request signal transmitted from the second terminal device 10b by the user pushing the button is received by the server device 14 is indicated by a "second transmission." This also corresponds to a part of the delay time in transmission routes described above.

The same description as that for the second terminal device 10b holds for the third terminal device 10c and the fourth terminal device 10d, only by replacing the second terminal device 10b with the third terminal device 10c and the fourth terminal device 10d, respectively. The "reproduction period" is common among the second terminal device 10b to the fourth terminal device 10d. Also in the server device 14, the "first transmission delay period" occurs as in the case of the second terminal device 10b when the audio signal is transmitted to the server device 14 from the first terminal device 10a. However, the server device 14 starts a process after receiving the audio signal, and therefore, the first transmission delay period is omitted. Consequently, in the server device 14, after the "audio signal reproduction period" is indicated as the "reproduction period," a "response waiting period" and a "normal waiting period" are defined. These processes will be described later.

In a case where it is difficult to measure the first transmission delay period, which is a transmission delay from the first terminal device 10a to another terminal device 10, in the server device 14, a transmission delay from the server device 14 to each of the terminal devices 10 may be measured and used as the first transmission delay period by the server device 14. Even in that case, the first transmission delay period and the second transmission delay period may be different from each other. This is because that a transmission rate in a direction toward the terminal device 10 from the server device 14 (hereinafter referred to as "downward direction") and a transmission rate in a direction toward the server device 14 from the terminal device 10 (hereinafter referred to as "upward direction") may be different from each other. In addition, a communication route in the downward direction and that in the upward direction may be different from each other. Furthermore, since the first transmission delay period and the second transmission delay period are not always constant, these may be derived as an average value.

In addition, it is difficult for the server device 14 to directly derive a response period in each terminal device 10. Therefore, the server device 14 estimates the response period. For the estimation, the server device 14 measures the first transmission delay period and the second transmission delay period for each terminal device 10 in advance, and derives a reproduction period of the audio signal. Here, the reproduction period of the audio signal may be derived, for example, by reproducing the audio signal, or by analyzing the acquired audio signal and detecting the start and the end of the audio signal to derive the reproduction period. Furthermore, the server device 14 derives the response period by subtracting the reproduction period, the first transmission delay period, and the second transmission delay period from the timing when the right-to-speak request signal has been received.

Figure 3:
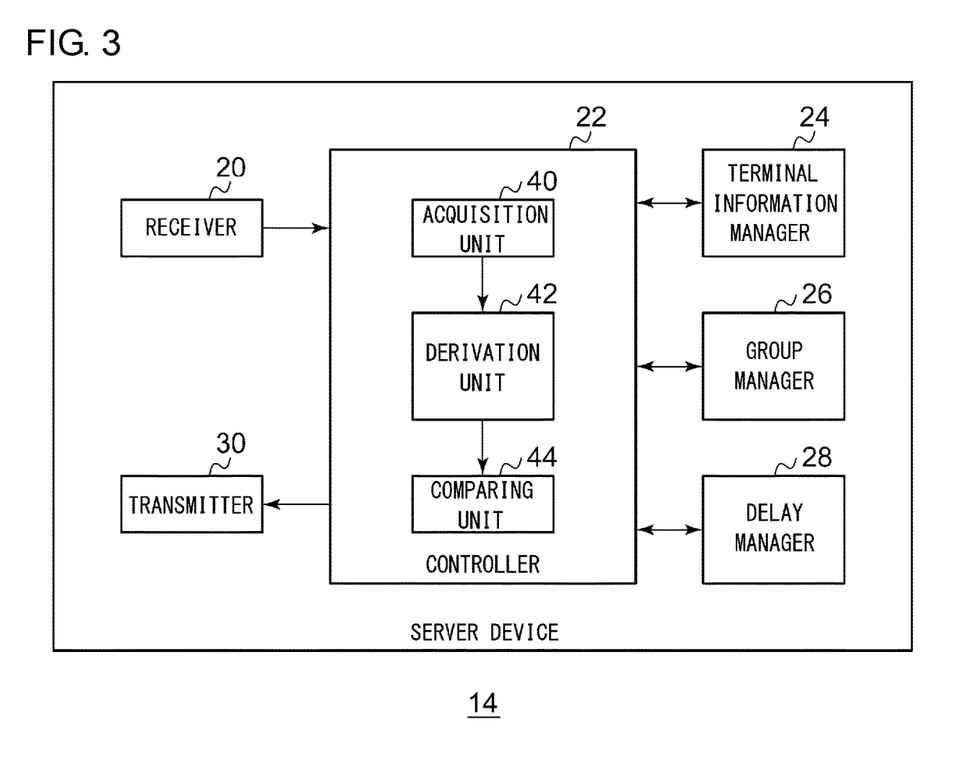
FIG. 3 is a diagram illustrating a configuration of a server device of FIG. 1.

FIG. 3 illustrates a configuration of the server device 14. The server device 14 includes a receiver 20, a controller 22, a terminal information manager 24, a group manager 26, a delay manager 28, and a transmitter 30. The controller 22 includes an acquisition unit 40, a derivation unit 42, and a comparing unit 44. The receiver 20 is connected to the network 12 and receives a signal from the terminal device 10 through the network 12. The signal received by the receiver 20 includes a signal used to connect the terminal device 10 and the like irrespective of the right-to-speak request signal described above. The receiver 20 outputs the received signal to the controller 22.

The controller 22 executes communication routing or session control based on the signal received by the receiver 20. For example, when the first terminal device 10a and the second terminal device 10b employ different types of codec from each other, there is a need to transmit a result of transcoding. Therefore, the controller 22 controls the transmission route such that communication is transmitted through a transcoder. In addition, the controller 22 controls the terminal information manager 24 and executes acquisition and management of status information of each terminal device 10 and information specific to the terminal device 10. Furthermore, the controller 22 controls the group manager 26, and manages that which group the terminal device 10 included in the PoC service belongs to.

The terminal information manager 24 is connected to the controller 22 and manages presence information of each terminal devices 10, information of the codec to be used, information of a priority period, and the like. The group manager 26 manages group information regarding a group to which each terminal device 10 belongs, and provides the group information as needed.

The delay manager 28 is connected to the controller 22 and measures the first transmission delay period for each terminal device 10. At that time, the delay manager 28 transmits a downward measurement signal including transmission time from the transmitter 30. The transmitted downward measurement signal is received by each terminal device 10 through the network 12. Each terminal device 10 transmits an upward response signal including reception time of the downward measurement signal to the server device 14 through the network 12. The receiver 20 receives and outputs the upward response signal to the controller 22. The delay manager 28 extracts the reception time included in the upward response signal from the receiver 20, and subtracts the transmission time from the reception time, thereby deriving the first transmission delay period for each terminal device 10. The subtraction of the transmission time from the reception time may be performed in the terminal device 10. On that occasion, the delay manager 28 receives a response signal including the first transmission delay period therein from the terminal device 10.

The delay manager 28 measures the second transmission delay period for each terminal device 10. At that time, the delay manager 28 transmits, from the transmitter 30, an instruction signal for causing signal transmission. The transmitted instruction signal is received by each terminal device 10 through the network 12. When receiving the instruction signal, each terminal device 10 transmits an upward measurement signal including transmission time to the server device 14 through the network 12. The receiver 20 receives and outputs the upward measurement signal to the controller 22, and also outputs reception time of the upward measurement signal to the controller 22. The delay manager 28 extracts the transmission time included in the upward measurement signal from the receiver 20, and subtracts the transmission time from the reception time, thereby deriving the second transmission delay period for each terminal device 10. In a case where the instruction signal is not transmitted, the upward response signal also includes the transmission time. The delay manager 28 may derive the second transmission delay period by subtracting the transmission time included in the upward response signal from the reception time of the upward response signal.

Figure 4:
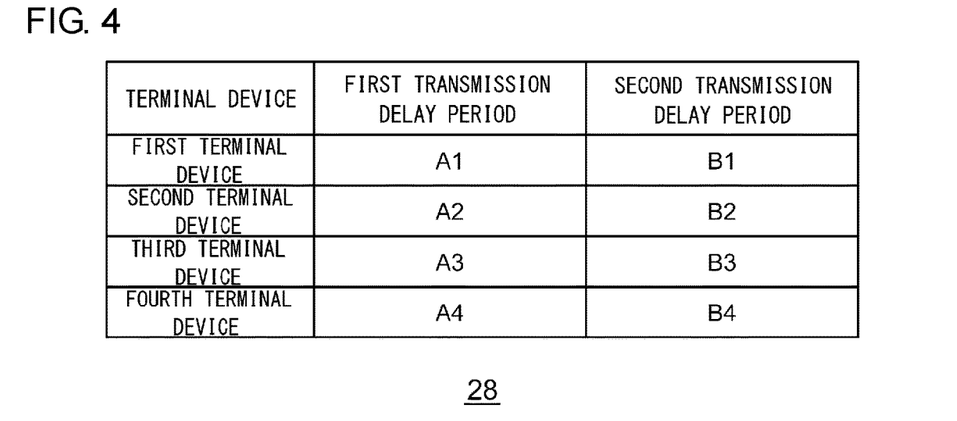
FIG. 4 is a table illustrating a data configuration of a database stored in a delay manager of FIG. 3.

The delay manager 28 may derive an average value of the first transmission delay period and may derive an average value of the second transmission delay period by executing the above-described process more than once. Hereinafter, the average value of the first transmission delay period is also referred to as a first transmission delay period, and the average value of the second transmission delay period is also referred to as a second transmission delay period. The delay manager 28 manages the first transmission delay period and the second transmission delay period for each terminal device 10. FIG. 4 illustrates a data configuration of a database stored in the delay manager 28. As illustrated in the drawing, the first transmission delay period and the second transmission delay period for each of the first terminal device 10a to the fourth terminal device 10d are stored. Return to FIG. 3.

The receiver 20 receives an audio signal from the transmitting side terminal device 10 through the network 12. The receiver 20 outputs the received audio signal to the controller 22. When the audio signal is input from the receiver 20, the acquisition unit 40 acquires a reproduction period by reproducing the audio signal. In a case where information regarding the reproduction period is included in the audio signal, the acquisition unit 40 may extract the information regarding the reproduction period from the audio signal without reproducing the audio signal.

Subsequently, the receiver 20 receives a right-to-speak request signal transmitted from the receiving side terminal device 10, for example, the second terminal device 10b, through the network 12. The right-to-speak request signal is transmitted when the reproduction of the audio signal is finished in each of the receiving side terminal devices 10 which has received the audio signal from the transmitting side terminal device 10, for example, the first terminal device 10a, and a user who wishes to respond to the content of the reproduced audio signal has pushed down a button for a PTT operation included in the terminal device 10. The receiver 20 outputs the received right-to-speak request signal to the controller 22, and also outputs reception time of the right-to-speak request signal to the controller 22.

The controller 22 grants the right-to-speak to any one of the receiving side terminal devices 10 based on the right-to-speak request signal received by the receiver 20. Here, as illustrated in FIG. 2, the controller 22 sets a "response waiting period" over a predetermined period of time after the end of the reproduction of the audio signal. In addition, the controller 22 sets a "normal waiting period" after the elapse of the response waiting period. Here, the response waiting period is set by adding a margin to a sum of a maximum acceptable value as the first transmission delay period, a maximum acceptable value as the second transmission delay period, and a maximum acceptable value as the response period. The response waiting period is a period for waiting a plurality of right-to-speak request signals transmitted in a reflection of the content of the audio signal and to be compared to each other. On the other hand, the normal waiting period is a period for waiting a right-to-speak request signal transmitted irrespective of the content of the audio signal.

The controller 22 grants the right-to-speak to any one of the terminal devices 10 by executing, during the response waiting period, the following processes to the right-to-speak request signal received by the receiver 20. On the other hand, the controller 22 grants the right-to-speak to the right-to-speak request signal received by the receiver 20 during the normal waiting period in order of reception.

The acquisition unit 40 acquires reception time of the right-to-speak request signal from the receiver 20 and acquires the first transmission delay period and the second transmission delay period from the delay manager 28. These are acquired for each terminal device 10. The acquisition unit 40 outputs the reproduction period, the reception time, the first transmission delay period, and the second transmission delay period to the derivation unit 42 for each terminal device 10.

The derivation unit 42 inputs the reproduction period, the reception time, the first transmission delay period, and the second transmission delay period from the acquisition unit 40 for each terminal device 10. The derivation unit 42 subtracts the reproduction period, the first transmission delay period, and the second transmission delay period from the timing when the right-to-speak request signal has been received, in other words, the reception time, for each of receiving side terminal devices 10. The result of the subtraction is the response period of from when the reproduction of the audio signal ends to when the right-to-speak is requested. In addition, the derivation unit 42 may derive a priority period from the terminal information manager 24 for each terminal device 10. The priority period is a value for shortening the response period, and is set to a greater value for a terminal device 10 more desired to be selected. The derivation unit 42 selects the response period and the priority period for the same terminal device 10, and adjusts the response period by subtracting the selected priority period from the selected response period. The derivation unit 42 outputs, to the comparing unit 44, the response period for each of the receiving side terminal devices 10.

The comparing unit 44 inputs the response period for each of the receiving side terminal devices 10 from the derivation unit 42. The comparing unit 44 compares the response period for each of the receiving side terminal devices 10, and selects a receiving side terminal device 10 having the shortest response period. In addition, the comparing unit 44 grants the right-to-speak to the selected receiving side terminal device 10. The receiving side terminal device 10 which has been granted the right-to-speak is the next transmitting side terminal device 10. The comparing unit 44 generates a notification signal which indicates the terminal device 10 to which the right-to-speak has been granted, and outputs the notification signal to the transmitter 30.

The transmitter 30 inputs the notification signal from the comparing unit 44. By transmitting the notification signal to the terminal device 10 to which the right-to-speak has been granted in the comparing unit 44, the transmitter 30 notifies the terminal device 10 of the grant of the right-to-speak. In addition, the transmitter 30 may transmit the notification signal to a terminal device 10 other than the terminal device 10 to which the right-to-speak has been granted.

By receiving the notification signal, the terminal device 10 not illustrated and to which the right-to-speak has been granted recognizes that the right-to-speak has been granted. As a result, the terminal device 10 operates as a transmitting side terminal device 10. Furthermore, by receiving the notification signal, other terminal devices 10 recognize the transmitting side terminal device 10. Subsequently, the transmitting side terminal device 10 transmits an audio signal, and a plurality of networks 12 receives the audio signal.

The configuration can be realized, as hardware, by a CPU, a memory, and other LSI of any computer, and as software, by a program loaded in a memory, and the like. Here, a functional block realized by cooperation of the above components is illustrated. Therefore, it is understood by a person skilled in the art that the functional block can be realized in various ways, for example, by only the hardware, only the software, or a combination of the hardware and the software.

Figure 5:
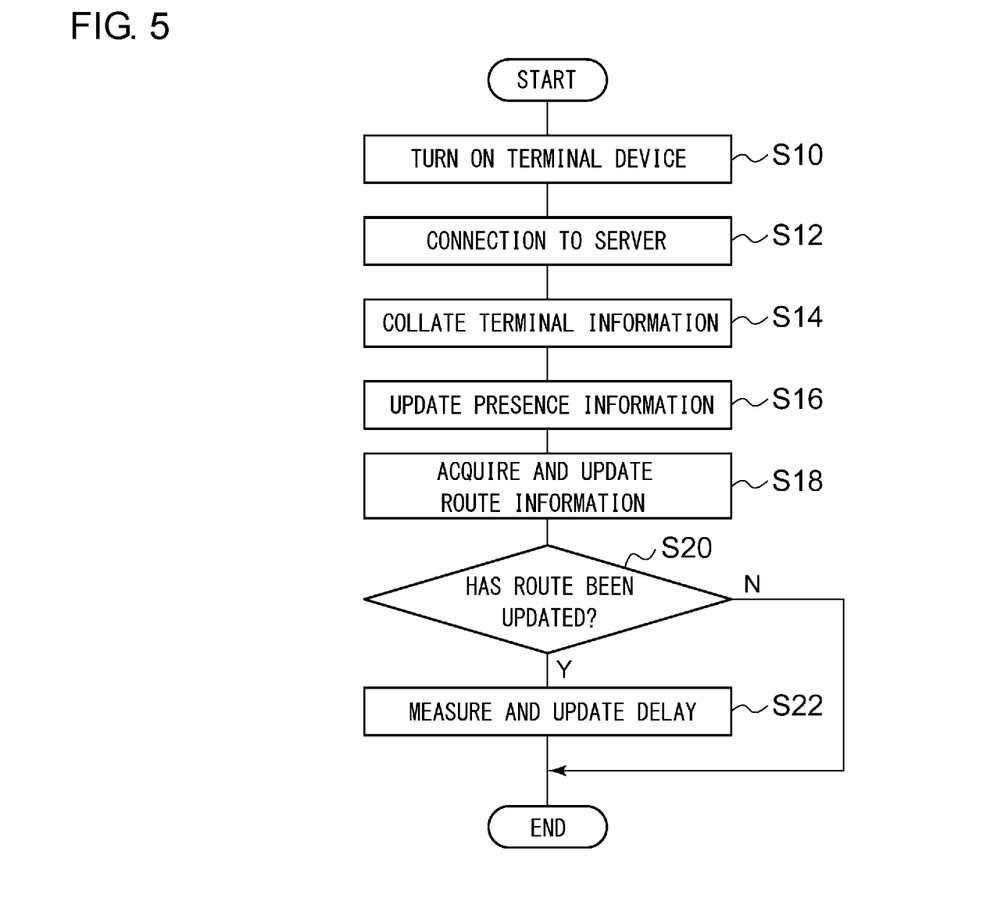
FIG. 5 is a flowchart illustrating a connection procedure of a terminal device performed by the communication system of FIG. 1.

An operation of the communication system 100 having the above configuration will be described. FIG. 5 is a flowchart illustrating a connection procedure of the terminal device 10 performed by the communication system 100. The terminal device 10 is turned ON (S10). The terminal device 10 is connected to the server device 14 through the network 12 (S12). The server device 14 collates terminal information (S14), updates presence information (S16), and acquires and updates route information (S18). When the route has been updated (Y in S20), the server device 14 measures and updates a delay (S22). When the route has not been updated (N in S20), Step 22 is skipped.

Figure 6:
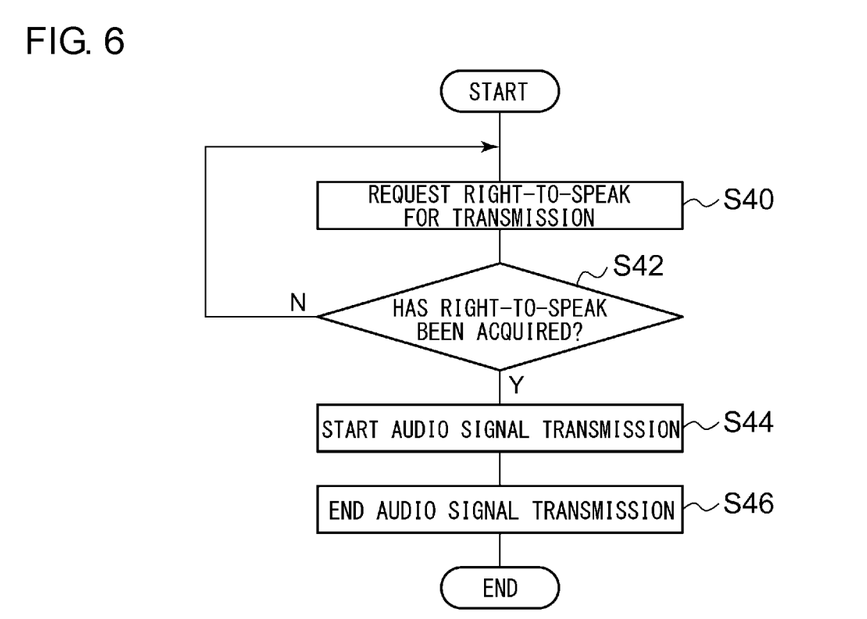
FIG. 6 is a flowchart illustrating a transmitting procedure performed by the terminal device of FIG. 1.

FIG. 6 is a flowchart illustrating a transmitting procedure performed by the terminal device 10. The terminal device 10 requests the right-to-speak for transmission (S40). When the right-to-speak has not been acquired (N in S42), the procedure returns to Step 40. When the right-to-speak has been acquired (Y in S42), the terminal device 10 starts audio signal transmission (S44). The terminal device 10 ends the audio signal transmission (S46).

Figure 7:
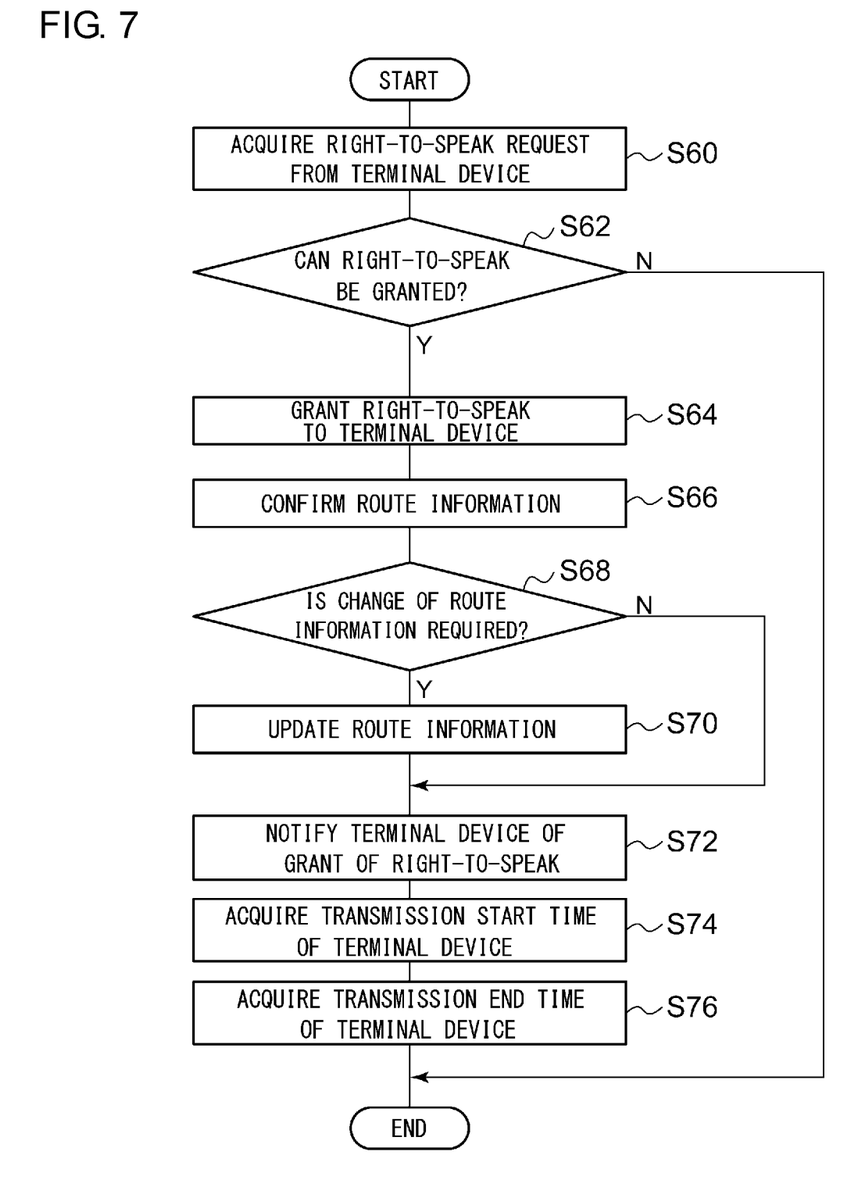
FIG. 7 is a flowchart illustrating an outline of a communication procedure performed by the server device of FIG. 2.

FIG. 7 is a flowchart illustrating an outline of a communication procedure performed by the server device 14. The receiver 20 acquires a right-to-speak request from the terminal device 10 (S60). When the right-to-speak can be granted (Y in S62), the comparing unit 44 grants the right-to-speak to the terminal device 10 (S64). The controller 22 confirms the route information (S66). When a change of the route information is required (Y in S68), the controller 22 updates the route information (S70). When a change of the route information is not required (N in S68), Step 70 is skipped. The transmitter 30 notifies the terminal device 10 of the grant of the right-to-speak (S72). The acquisition unit 40 acquires the transmission start time of the terminal device 10 (S74). The acquisition unit 40 acquires the transmission end time of the terminal device 10 (S76). When the right-to-speak cannot be granted (N in S62), Steps 64 to 76 are skipped.

Figure 8:
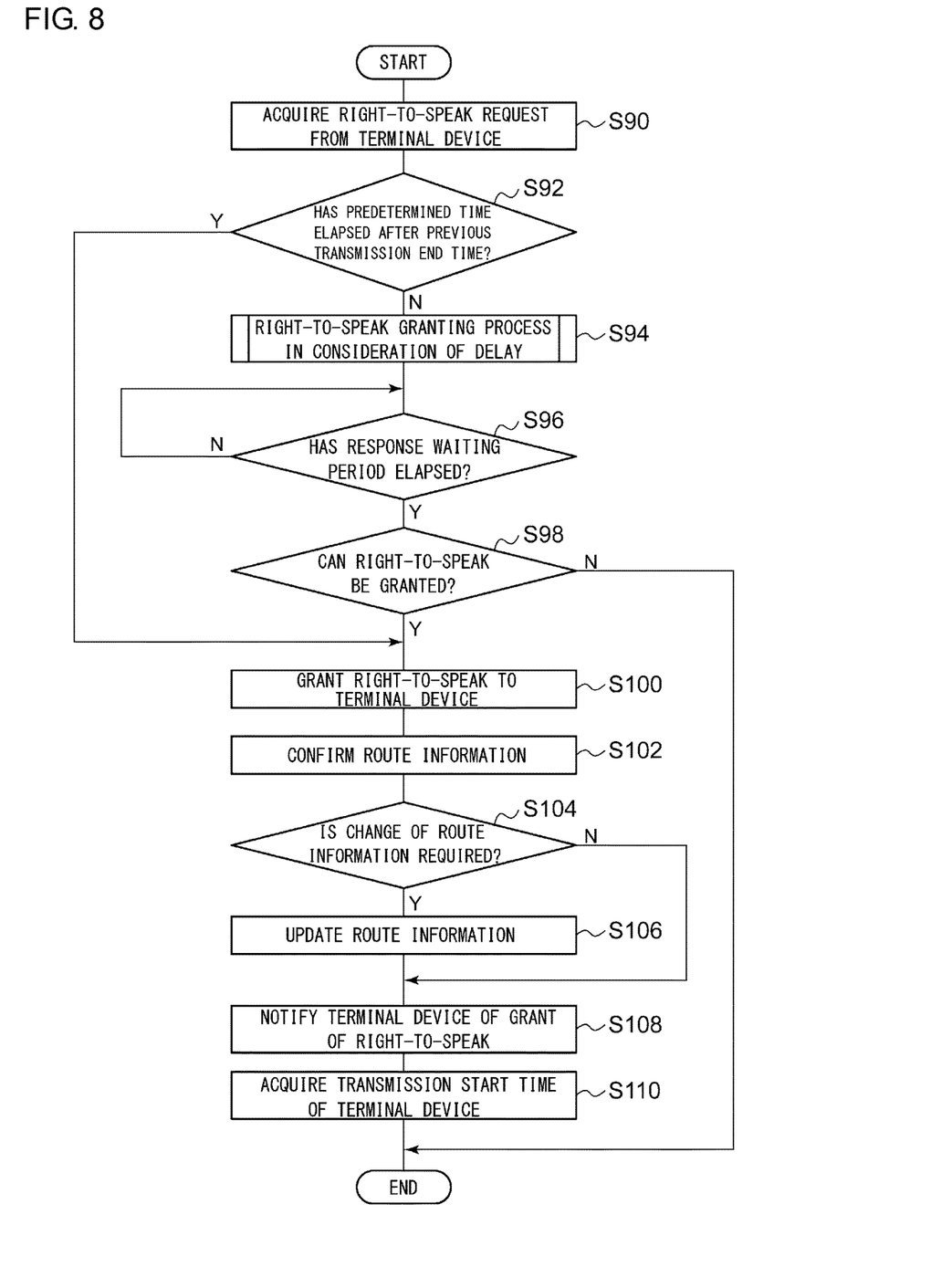
FIG. 8 is a flowchart illustrating the communication procedure performed by the server device of FIG. 2.

FIG. 8 is a flowchart illustrating the communication procedure performed by the server device 14. The receiver 20 acquires a right-to-speak request from the terminal device 10 (S90). When a predetermined time has not elapsed after the previous transmission end time (N in S92), the controller 22 executes a right-to-speak granting process in consideration of a delay (S94). When the response waiting period has not elapsed (N in S96), the process waits. When the response waiting period has elapsed (Y in S96), and the right-to-speak can be granted (Y in S98), the comparing unit 44 grants the right-to-speak to the terminal device 10 (S100).

The controller 22 confirms the route information (S102). When a change of the route information is required (Y in S104), the controller 22 updates the route information (S106). When a change of the route information is not required (N in S104), Step 106 is skipped. The transmitter 30 notifies the terminal device 10 of the grant of the right-to-speak (S108). The acquisition unit 40 acquires the transmission start time of the terminal device 10 (S110). When a predetermined time has elapsed after the previous transmission end time (Y in S92), Steps 94 to 98 are skipped. When the right-to-speak cannot be granted (N in S98), Steps 100 to 110 are skipped.

Figure 9:
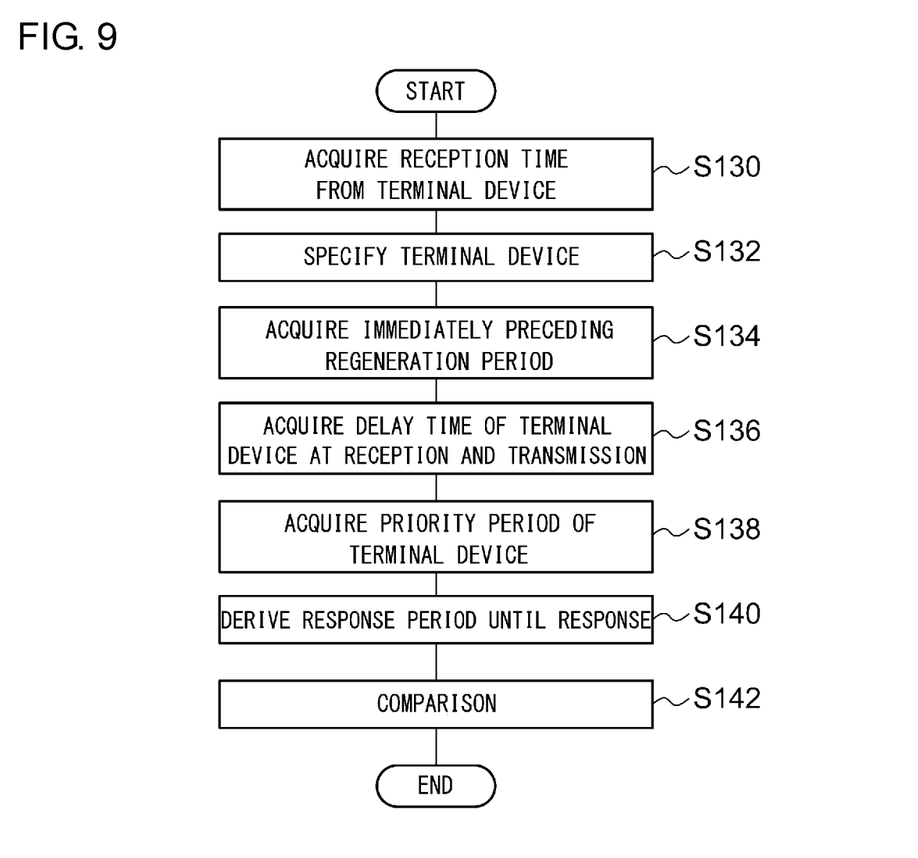
FIG. 9 is a flowchart illustrating a right-to-speak granting procedure performed by the server device of FIG. 2.

FIG. 9 is a flowchart illustrating a right-to-speak granting procedure performed by the server device 14. This corresponds to Step 94 in FIG. 8. The acquisition unit 40 acquires reception time from the terminal device 10 (S130). The acquisition unit 40 specifies the terminal device 10 (S132) and acquires an immediately preceding reproduction period (S134). The acquisition unit 40 acquires delay time of the terminal device 10 at the reception and the transmission (S136). The acquisition unit 40 acquires the priority period of the terminal device 10 (S138). The derivation unit 42 derives a response period until response (S140). The comparing unit 44 compares the response period (S142).

According to the embodiment, since the right-to-speak is granted to one terminal device by deriving a response period for each of the receiving side terminal devices and comparing the response periods, the right-to-speak can be granted without partiality. In addition, since the response period is adjusted by subtracting the priority period from the response period, the right-to-speak can be easily granted to a predetermined terminal device. In addition, since the response periods are compared with respect to the right-to-speak request signals received during the response waiting period, the right-to-speak can be granted without partiality in a case of transmission performed in accordance with the audio signal which has been received. In addition, since the right-to-speak is granted in order of reception during the normal waiting period, the process can be simplified.

The present invention has been described above based on the embodiment. The embodiment is for illustrative purposes, and it is understood by a person skilled in the art that various modifications are possible for combinations of respective components or respective processing processes thereof, and that such modifications are also included in the scope of the present invention.

In the embodiment, a mobile communication network is used for the communication system 100. However, there is no limitation thereto. For example, a wireless communication system other than the mobile communication network, such as business-use radio may be used. According to the embodiment, the degree of freedom of a configuration can be increased.

In the embodiment, the controller 22 grants the right-to-speak to the right-to-speak request signal received by the receiver 20 in order of reception during the normal waiting period. However, there is no limitation thereto. For example, the controller 22 may grant the right-to-speak in consideration of the second transmission delay period. Specifically, when the receiver 20 receives the right-to-speak request signal during the normal waiting period, the controller 22 acquires reception time of the right-to-speak request signal received by the receiver 20. In addition, the controller 22 derives transmission timing of the right-to-speak request signal by subtracting the second transmission delay period from the reception time. Furthermore, the controller 22 grants the right-to-speak to any one of the receiving side terminal devices 10 by comparing the transmission timing. According to the variation, the right-to-speak can be granted without partiality even in the normal waiting period.

In the embodiment, the response period is derived in the controller 22 by using the first transmission delay period and the second transmission delay period. However, there is no limitation thereto. For example, the transmitter 30 may transmit one or more of the first transmission delay period, the second transmission delay period, and the response period to the terminal device 10, and this information may be displayed on the terminal device 10. According to the variation, a user can confirm this information.

What is claimed is:

1. A server device that manages a right-to-speak in a case where in a plurality of terminal devices, a terminal device with the right-to-speak is a transmitting side terminal device and a terminal device without the right-to-speak is a receiving side terminal device, the server device comprising:

a receiver that receives, as a response to content of an audio signal received in each of the receiving side terminal devices which has received the audio signal from the transmitting side terminal device, right-to-speak request signals transmitted from the receiving side terminal devices;

a controller that grants the right-to-speak to any one of the receiving side terminal devices based on the right-to-speak request signals received by the receiver; and a transmitter that notifies the receiving side terminal device to which the right-to-speak has been granted by the controller of the grant of the right-to-speak, wherein the controller comprises:

an acquisition unit that acquires a reproduction period of the audio signal, a first transmission delay period of from the transmitting side terminal device or the server device to each of the receiving side terminal devices, and a second transmission delay period of from each of the receiving side terminal devices to the server device;

a derivation unit that derives a response period of from when the reproduction of the audio signal ends to when the right-to-speak is requested, for each of the receiving side terminal devices, by subtracting the reproduction period, the first transmission delay period, and the second transmission delay period from timing when the right-to-speak request signal has been received by the receiver; and a comparing unit that compares the response period of each of the receiving side terminal devices derived by the derivation unit to grant the right-to-speak to any one of the receiving side terminal devices.

2. The server device according to claim 1, wherein the derivation unit retains a priority period for each of the receiving side terminal devices, and the derivation unit adjusts the response period by subtracting the priority period from the response period.

3. The server device according to claim 1, wherein the controller causes the derivation unit and the comparing unit to execute a process to the right-to-speak request signals received by the receiver in a predetermined period of time after the end of the reproduction of the audio signal.

4. The server device according to claim 2, wherein the controller causes the derivation unit and the comparing unit to execute a process to the right-to-speak request signals received by the receiver in a predetermined period of time after the end of the reproduction of the audio signal.

5. The server device according to claim 1, wherein the controller grants the right-to-speak to the right-to-speak request signals received by the receiver in order of reception after the elapse of a predetermined period of time after the end of the reproduction of the audio signal.

6. The server device according to claim 2, wherein the controller grants the right-to-speak to the right-to-speak request signals received by the receiver in order of reception after the elapse of a predetermined period of time after the end of the reproduction of the audio signal.

7. The server device according to claim 3, wherein the controller grants the right-to-speak to the right-to-speak request signals received by the receiver in order of reception after the elapse of a predetermined period of time after the end of the reproduction of the audio signal.

8. The server device according to claim 4, wherein the controller grants the right-to-speak to the right-to-speak request signals received by the receiver in order of reception after the elapse of a predetermined period of time after the end of the reproduction of the audio signal.

9. The server device according to claim 1, wherein when the receiver receives the right-to-speak request signals after the elapse of a predetermined period of time after the end of the reproduction of the audio signal, the controller derives transmission timing of the right-to-speak request signals for two or more receiving side terminal devices that are sources of the right-to-speak request signals, respectively, by subtracting the second transmission delay period from the timing when the right-to-speak request signals have been received by the receiver, and compares the transmission timing to grant the right-to-speak to any one of the receiving side terminal devices.

10. The server device according to claim 2, wherein when the receiver receives the right-to-speak request signals after the elapse of a predetermined period of time after the end of the reproduction of the audio signal, the controller derives transmission timing of the right-to-speak request signals for two or more receiving side terminal devices that are sources of the right-to-speak request signals, respectively, by subtracting the second transmission delay period from the timing when the right-to-speak request signals have been received by the receiver, and compares the transmission timing to grant the right-to-speak to any one of the receiving side terminal devices.

11. The server device according to claim 3, wherein when the receiver receives the right-to-speak request signals after the elapse of a predetermined period of time after the end of the reproduction of the audio signal, the controller derives transmission timing of the right-to-speak request signals for two or more receiving side terminal devices that are sources of the right-to-speak request signals, respectively, by subtracting the second transmission delay period from the timing when the right-to-speak request signals have been received by the receiver, and compares the transmission timing to grant the right-to-speak to any one of the receiving side terminal devices.

12. The server device according to claim 4, wherein when the receiver receives the right-to-speak request signals after the elapse of a predetermined period of time after the end of the reproduction of the audio signal, the controller derives transmission timing of the right-to-speak request signals for two or more receiving side terminal devices that are sources of the right-to-speak request signals, respectively, by subtracting the second transmission delay period from the timing when the right-to-speak request signals have been received by the receiver, and compares the transmission timing to grant the right-to-speak to anyone of the receiving side terminal devices.

13. A terminal device capable of communicating with the server device according to claim 1.

* * * * *